United States Patent Office 3,795,622

Patented Mar. 5, 1974

3,795,622

PRE-ETCH TREATMENT OF ACRYLONITRILE-BUTADIENE-STYRENE RESINS FOR ELECTROLESS PLATING

Oleh Borys Dutkewych, 22 Evergreen Way, Medfield, Mass. 02052, and William A. Conlan, Jr., 34 Summer St., Attelboro, Mass. 02703

No Drawing. Original application June 14, 1971, Ser. No. 152,995. Divided and this application July 31, 1972, Ser. No. 276,674

Int. Cl. C09k *3/00;* C23d *1/00*

U.S. Cl. 252—79.1 10 Claims

ABSTRACT OF THE DISCLOSURE

Aqueous solution are provided containing at least one five-membered heterocyclic compound having a nuclear carbonyl group and at least one heterocyclic oxygen atom. The solutions are used primarily as a pre-treatment prior to etching for the electroless metal plating of acrylonitrile-butadiene-styrene resins (ABS resins) to improve adhesion between an ABS resin substrate and a deposited electroless metal. An overall process for metal plating on ABS substrate would include the steps of pre-etching with the solution of this invention, oxidizing with a strong oxidizing agent, preferably, a chromic acid conditioning solution having a high hexavalent chromium content, catalyzing the so-treated substrate to make the same catalytic to deposition from an electroless plating solution and depositing electroless metal over the substrate.

This is a division of application Ser. No. 152,995, filed on June 14, 1971.

BACKGROUND OF THE INVENTION

(1) Introduction

This invention relates to electroless metal plating of synthetic polymeric resin surfaces, and more particularly, to aqueous solutions for pre-treating an acrylonitrile-butadiene-styrene surface prior to etching in an electroless metal plating process.

(2) Description of the prior art

Within recent years, considerable demand has developed for metal plating on non-conductive articles, particularly plastic articles. In the finished product, the desirable characteristics of the plastic and metal are combined to offer the technical and aesthetic advantages of each. For example, the lower-weight, easily-formed, high-impact strength of articles fabricated from acrylonitrile-butadiene-styrene resins (ABS resins) may be aesthetically and mechanically enhanced by metal coating. Although ABS resins, like most plastics, are electrically non-conductive, a metal bond to the surface can be established by an initial plating operation, known as electroless plating. This is typically accomplished by conditioning the surface for plating by etching with a strong oxidizing acid, catalyzing the surface by contact with a noble metal either in solution or colloidal form, palladium being an example of a suitable noble metal, then immersing the catalyzed surface in an autocatalyic electroless solution where a coating of a conductive metal such as copper or nickel is established by chemical deposition. The electroless metal coating may be built up to a desired thickness or may be overcoated with an electrolytic metal coating.

Adhesion between a metal plate and the ABS resin substrate is however, dependent upon the strength of the resin to metal bond. Adhesion in the prior art has been fairly poor, ranging from only between 5 to 12 pounds per inch using the standard 90° peel test.

It has been proposed in the prior art to improve adhesion between an ABS substrate and an electroless metal plate by pre-etching the surface of the ABS with an "ABS solvent" prior to etching with a strong oxidizing acid. The ABS solvent has been defined to include those liquid solutions which form a cloudy dispersion or mixture within twenty-four hours when 200 mls. of the liquid are added to 10 grams of ABS, the cloudy formation being due to partial dissolution of the polymer. Though this pre-etch solution does improve bond strength between the ABS and the metal deposit, it is useful only with "plateable grades" of ABS resin and does not provide the desired aesthetic effect.

STATEMENT OF THE INVENTION

The subject invention provides a pre-etch for ABS resins that improves adhesion between an ABS substrate and a subsequently applied electroless metal deposit. In addition, the pre-etch is useful with both the "plateable" and "non-plateable" grades of ABS resins and provides a deposit aesthetically improved over deposits obtained using prior art pre-etch solutions.

The pre-etch of the invention comprises a solution of at least one five-membered heterocyclic compound containing a nuclear carbonyl group and at least one heterocyclic oxygen atom. A preferred overall process for metal plating ABS resin substrates would include the steps of pre-etching with the solution of this invention, oxidizing with a strong oxidizing agent, preferably a chromic acid conditioning solution having a high hexavalent chromium content, catalyzing the so-treated substrate to make the same catalytic to deposition from an electroless plating solution and electrolessly depositing metal over the substrate.

DESCRIPTION OF THE PREFERRED EMBODIMENTS

The ABS resins treated according to the practice of this invention are generally articles molded or fabricated from both plateable and non-plateable grades of resins obtained by interpolymerization or blending or acrylonitrile, butadiene and styrene.

The pre-etch solutions used for preparing the ABS resin for plating, in accordance with the practice of this invention, comprise an aqueous solution of at least one five-membered heterocyclic compound containing a nuclear carbonyl group and at least one heterocyclic oxygen atom. Preferred heterocyclic compounds are illustrated by the following structural formula:

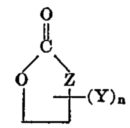

where Z is selected from the group consisting of oxygen and —$CH_2$—; Y represents one or more substituents on the nuclear carbon atoms comprising the heterocyclic ring including the nuclear carbon when Z is —$CH_2$—, and *n* is a whole integer varying between 0 and 2 when Z is oxygen and 0 and 3 when Z is —$CH_2$—. The particular substituent represented by Y is not critical and may represent a polar group such as —$NO_2$—, —$SO_3OH$, —Cl, —Br, —I, —F, —COOH, —$NH_2$ and the like, or a lower aliphatic radical having up to 8 carbon atoms including alkyl, alkyl substituted with any of the above polar groups, or alkoxy.

In accordance with a most preferred embodiment of the invention, the pre-etch solution is an aqueous solution of a mixture of heterocyclics conforming to the following structural formulas:

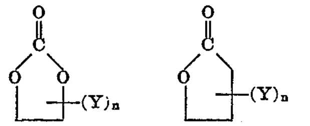

where Y and *n* are as defined above.

Examples of suitable materials conforming to the above formulas include, for purposes of illustration, 2-acetylbutyrolactone, alpha-amino-gamma-butyrolactone, alpha-angelic lactone, L-ascorbic acid, alpha - bromotetranoic acid, alpha-bromo-gamma-valerolactone, gamma-butrylolactone, alpha - butyrolactone - gamma-carboxylic acid, D,L-isocitric acid lactone, gamma-octanoic lactone, gamma valerolactone, gamma-heptanoic lactone, chloro methylethylene carbonate, ethylene carbonate, propylene carbonate, glycerine carbonate and the like.

The heterocyclics noted above, in accordance with the practice of the invention, may not be used at full strength to treat the ABS resin as the attack on the surface of the ABS would be too great. Thus, they are used in an aqueous solution where solution strength is such that the solution of the heterocyclic is not a solvent for the ABS. In this connection, a simple test to determine whether the aqueous solution of the heterocyclic is a solvent for the ABS is that noted above where 10 grams of ABS are left in 200 ml. of a test solution for 24 hours. If a cloudy dispersion or mixture forms within the 24 hours, the aqueous solution is considered to be a solvent for the ABS and not within the scope of this invention. To make the same a non-solvent for the ABS in accordance with the invention and the definition set forth herein, the solution should be further diluted with water.

As a general guideline only, formulations in accordance with the invention comprise from 5 to 35% by volume of the heterocyclic dissolved in water and preferably from 5 to 30% by volume. However, the ultimate test is as described above where the maximum heterocyclic is less than that which forms a cloudy dispersion when 10 grams of the ABS are left standing in 200 ml. of the solution for 24 hours.

A most preferred formulation in accordance with the invention would be a mixture of gamma-butyrolactone and propylene carbonate in aqueous solution where the total volume of the heterocyclic varies between 5 and 30% and the ratio of the propylene carbonate to the gamma-butyrolactone varies between 5.0 to 1 and 1.0 to 1.0 and preferably is about 2 to 1.

Surface active agents, such as non-ionic wetting agents, may advantageously be added to the pre-etch solutions of the invention to promote even etching.

It is contemplated that the pre-etch may also contain other materials in minor amount which may act as solvents for the ABS resin. When present, however, they must not cause gelation or physical attack on the surface, which has been found to be detrimental to the appearance of the finished article.

Since the action of the pre-etch is only to satinize the surface of the ABS resin substrate, the substrate may be safely immersed in the pre-etch for long periods of time. For practical reasons, however, a residence time ranging from about ½ to about 3 minutes and preferably about 1 minute is typically employed.

Solution temperature is not critical. However, elevated temperatures speed the process and temperatures from about 90° F. up to the softening point of the ABS resin, preferably from about 90° to 130° F., and more preferably, from about 100 to 110° F., are advantageously employed.

After treating the surface of the ABS resin with the pre-etch solution according to the practice of this invention, the article may then be simply rinsed and passed directly to a strong oxidizing acid solution where the butadiene portion of the ABS resin is attacked, and then into a conventional catalysis and electroless plating solution.

Preferably, however, precautions to assure adequate pre-cleaning of the ABS are used to assure optimum bond strength. Generally, the part to be plated is optionally washed in a cleaner to remove grease or oil that might be on the surface of the part. Residence time is short, generally from about 1 to 3 minutes being sufficient. This step, however, may be eliminated when the ABS resin article is grease free.

After cleaning and the aforesaid pre-etch, the article is passed to a strong oxidizing acid etch. While any of the known oxidizing acid solutions for the butadiene portion of the ABS resin may be employed, it is preferred to use a strong chromic acid etch. The chromic acid etch used preferably contains from about 8.5 to about 10.5 pounds of chromic acid per gallon of solution, which is above the normal solubility of chromic acid in water. Higher solubility is achieved by the presence of trivalent chromium formed by the reduction of the hexavalent chromium during oxidation of the ABS resin surface. An initial solution of high chromic acid content may conveniently be obtained by the addition of oxalic acid to a chromic acid solution to form trivalent chromium ions followed by the addition of chromium trioxide to the resultant solution to form an oxidizing acid of the desired hexavalent chromium content.

The etch with the strong oxidizing acid is generally performed at a temperature of from about 110° F. to the distortion temperature of the ABS resin, preferably from about 110° to about 160° F., and most preferably, from about 140° to 150° F. Residence time generally ranges from about 5 to about 10 minutes, depending upon the nature of the ABS resin treated.

After etching with the strong oxidizing acid, the ABS resin is then passed to a spray rinse where any of the remaining acid is forcibly washed from the surface of the article .

Following spray removing, there may be one or more rinses in water and then a final cleaning with a mild alkaline neutralizer generally maintained at a temperature of from about 110° to 130° F. with a residence time of from about 3 to 5 minutes.

After final cleaning, the article may be passed to any of the conventional electroless plating operations known in the art, preferably using either copper or nickel. Conveniently, the conditioned ABS article may be immersed in a solution of stannous chloride-hydrochloric acid to sensitize the plastic surface by adsorption of stannous ions. This is generally followed by immersion in an acid solution of a noble metal salt, e.g., palladium chloride to activate the ABS article by reduction of the noble metal ions to metal. The noble metal film on the ABS article then acts as a catalyst in the electroless metal bath into which the activated ABS article is passed. Alternatively, the ABS article may be conditioned by immersion in an acidic, aqueous formulation that is the product of admixture of palladium chloride and a molar excess of stannous chloride, which formulation has a pH less than about 1.0.

A variety of electroless copper and nickel formulations may be used. For example, electroless copper formulations typically consist of a soluble cupric salt such as copper sulphate; a complexing agent for the cupric ion such as Rochelle salts; an alkali hydroxide for pH adjustment; a carbonate radical as a buffer; and a reducing agent for the cupric ion, such as formaldehyde; the mechanism by which objects having a catalyzed surface are plated has been explained in the literature, for example, U.S. Pat. No. 2,874,072 issued Feb. 17, 1959.

Following electroless plating, the ABS articles may be electrolytically plated by the conventional means with copper, nickel, gold, silver, chromium, and the like to provide the desired finish on the article. In such operations, the strength between the metal layer and the ABS substrate is dependent, in part, upon metal to metal bond strength. It has been observed that aging the electroless plated ABS article for periods as long as 24 hours or more has a beneficial effect on metal to plastic bond strength. It has also been observed however, that this is offset in part by a tendency of the electroless metal surface to oxidize and for adsorbed solids to migrate to the surface and dry. These phenomena have a deliterious effect on appearance and metal to metal bond strength. Thus, it has been found that immersion of the electrolessly plated ABS article in an aqueous solution containing an anionic or non-anionic surface active agent in an amount of from 0.5 to 2.0 percent by volume provides a thin film of protective coating on the surface of the article during aging. Any water soluble anionic or non-ionic surface active agent is generally suitable, such as, for example, ethylene oxide condensates containing at least about eight ethylene oxide groups; phosphate, sulphate and sulfonate modified ethylene oxides; dimethyloctane diol; oxyethylated sodium salts-amine polyglycol condensates; modified linear alcohol ethoxylates; alkyl phenol ethoxysulphate; sodium heptadecaacrylsulfates and the like as well as mixtures thereof may be used.

Generally, contact with the aqueous surfactant solution is followed by about a 4 to 5 minute immersion in tap water and a de-ionized water rinse. Providing the thin surfactor film prevents corrosion and drying out of adsorbed salts.

After aging for the desired period of time, usually fifteen minutes or more using forced warm air to four hours or more at ambient room temperature, the protective coating is removed by contact with an alkaline cleaner and a brief rinse in sulphuric acid. When the coating has been removed, the electrolessly plated article may be electrolytically plated.

Although many of these steps may be conveniently eliminated and the conditioned article passed from the pre-etch solution after a warm rinse directly to the oxidizing acid and thereafter directly to the electroless plating step, it has been observed that exercising care and thoroughly cleaning the article after each step has a cumulative beneficial effect on bond strength.

When used in accordance with the practice of this invention, the pre-etch will cause only a satinizing of the ABS resin substrate and ABS articles so treated will be uniform in appearance. The deposited metal coating will be uniform and the bond strength of either an electroless copper or nickel deposit to the surface will be high and independent of the electroless deposition technique employed. Moreover, high bond strength, often above 25 pounds per inch and typically in excess of 15 pounds per inch are achieved without adversely effecting the resin integrity. This is indicated by result of standard destruct peel tests in which it has been determined that failure is mainly at the resin-metal interface and there is little or no removal of plastic from the ABS substrate with the metal.

The following are examples of the practice of this invention. Peel strengths were determined by pulling a one inch wide strip of metal from the plastic at an angle of 90° using a Dillon pull test apparatus.

Example 1

A Cycolac ABS test plaque measuring three inches by three and one-half inches was used for plating. The following sequence of steps was employed.

| Composition | Temp. (° F.) | Time (min.) |
|---|---|---|
| Cleaner-alkaline solution of surfactant | 110 | 3 |
| Rinse | RT | 1 |
| Pre-etch | 105 | 2 |
| Propylene carbonate, 117 ml | | |
| Gamma butyrolactone, 63 ml | | |
| Surfactant, 10 ml | | |
| Water to 1 liter | | |
| Rinse | RT | 1 |
| Oxidizing etchant [1] | 150 | 10 |
| Chromium trioxide, 1,320 gm | | |
| Oxalic acid, 200 gm | | |
| Water to 1 liter | | |
| Rinse twice | RT | 1 |
| Neutralize, aqueous solution of diethylene triamine (1½% by wt.) | 115 | 3 |
| Rinse | | |
| Catalysis with Cuposit 6F [2] | RT | 2 |
| Rinse | RT | 1 |
| Accelerate with Accelerator 960 [3] | 120 | 2 |
| Rinse | | |
| Electroless plate with Cuposit copper 990–7 [4] | RT | 10 |
| Rinse | RT | 1 |
| Electroplate with electrolytic copper at 20 amp/ft.$^2$ | RT | 90 |

[1] The oxidizing etchant was prepared by initially forming a concentrate of 480 grams per liter of chromium trioxide and 400 grams per liter of oxalic acid. Then, to 250 milliliters of this concentrate were added 1100 grams of chromium trioxide and water to 1 liter. This was heated to about 180° F. for three hours. The hexavalent chromium content was found to be 9.8 pounds per gallon.

[2] Catalyst 6F is the product resulting from the admixture of palladium chloride and stannous chloride in hydrochloric acid solution. The stannous is present in molar excess of the palladium.

[3] Accelerator 960 is a dilute mineral acid solution.

[4] Cuposit copper 997 comprises a mixture of copper sulphate, formaldehyde, sodium hydroxide and a chelating system to maintain cupric ions in solution.

The copper plated ABS part formed by the above procedure had a smooth, bright surface appearance. The plastic to metal bond was found to be approximately 23 pounds per inch width.

Example 2

The procedure of Example 1 was repeated but a 12% by volume propylene carbonate solution was substituted for the pre-etch solution of Example 1. Again, a smooth, shiny copper surface was obtained and bond strength between the copper and plastic was found to be 16 pounds per inch width.

Example 3

The procedure of Example 1 was repeated, but a 17% by volume solution of gamma-butyrolactone was substituted for the pre-etch of Example 1. A smooth, shiny copper surface was obtained and the copper to plastic bond was found to be 15 pounds per inch width.

We claim:

1. A pre-etch composition for treating an acrylonitrile-butadiene-styrene substrate prior to metallizing, said pre-etch composition consisting of a solution of at least one heterocyclic compound containing a nuclear carbonyl group and a heterocyclic oxygen atom, the concentration of said heterocyclic compound in water being less than that which would make said solution a solvent for said acrylonitrile-butadiene-styrene resin.

2. The pre-etch composition of claim 1 where the concentration of said heterocyclic compound in solution is less than that which would cause a cloudy dispersion to form when 10 grams of said acrylonitrile-butadiene-styrene resin are left standing in 200 milliliters of said solution for 24 hours.

3. The pre-etch composition of claim 1 where the heterocyclic compound corresponds to the structural formula:

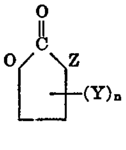

where Z is selected from the group of —O— and —$CH_2$—; Y represents a substituent on a nuclear carbon atom in the heterocyclic ring and $n$ is a whole integer ranging between 0 and 2 when Z is 0 and 0 and 3 when Z is —$CH_2$—.

4. The pre-etch composition of claim 3 where Y is selected from the group of hydrocarbon having up to 8 carbon atoms, haloalkyl having up to 8 carbon atoms, hydroxyalkyl having up to 8 carbon atoms and a polar group.

5. The pre-etch of claim 3 where the heterocyclic compound is a mixture of a propylene carbonate and a lactone.

6. The pre-etch of claim 5 where the mixture comprises gamma-butyrolactone and propylene carbonate.

7. The pre-etch of claim 6 where the ratio of the propylene carbonate to the butyrolactone volume varies between 5 to 1 and 1 to 1.

8. The pre-etch of claim 6 where the volume ratio of the propylene carbonate to the butyrolactone is about 2 to 1.

9. The pre-etch of claim 6 containing a minor amount of a surfactant.

10. The pre-etch of claim 8 where the total concentration of the heterocyclics in solution varies between about 5 and 30% by volume.

References Cited

UNITED STATES PATENTS 3,671,289 6/1972 Maguire et al. ------- 117—47 A

WILLIAM A. POWELL, Primary Examiner

U.S. Cl. X.R.

117—47 A; 156—2

PO-1050
(5/69)

UNITED STATES PATENT OFFICE
CERTIFICATE OF CORRECTION

Patent No. 3,795,622 Dated March 5, 1974

Inventor(s) Oleh Borys Dutkewych and William A. Conlan, Jr.

It is certified that error appears in the above-identified patent and that said Letters Patent are hereby corrected as shown below:

In the Heading of the patent, following the names of the inventors, insert Assignors to Shipley Company Inc., Newton, Mass.

Signed and sealed this 24th day of September 1974.

(SEAL)
Attest:

McCOY M. GIBSON JR.
Attesting Officer

C. MARSHALL DANN
Commissioner of Patents